United States Patent
Nichols

(10) Patent No.: US 10,320,442 B1
(45) Date of Patent: Jun. 11, 2019

(54) HIGH BANDWIDTH CHANNEL IN A FREQUENCY HOPPING SYSTEM

(71) Applicant: Ademco Inc., Golden Valley, MN (US)

(72) Inventor: Steven C. Nichols, Plymouth, MN (US)

(73) Assignee: Ademco Inc., Golden Valley, MN (US)

( * ) Notice: Subject to any disclaimer, the term of this patent is extended or adjusted under 35 U.S.C. 154(b) by 0 days.

(21) Appl. No.: 15/893,325

(22) Filed: Feb. 9, 2018

(51) Int. Cl.
*H04B 1/7136* (2011.01)

(52) U.S. Cl.
CPC .................................. *H04B 1/7136* (2013.01)

(58) Field of Classification Search
CPC ...... H04B 1/0014; H04B 1/005; H04B 1/086; H04B 1/38; H04B 1/3827; H04B 1/3833; H04B 1/40; H04B 1/50; H04B 1/713; H04B 1/7136; H04B 1/71362; H04B 2001/6904; H04B 2001/6908
USPC ............... 375/132, 133, 136, 219, 220, 259; 370/310, 310.2, 313, 328–330; 455/500, 455/517, 524, 525, 88
See application file for complete search history.

(56) References Cited

U.S. PATENT DOCUMENTS

| | | |
|---|---|---|
| 4,677,617 A | 6/1987 | O'Connor et al. |
| 5,251,210 A | 10/1993 | Mann et al. |
| 5,463,659 A | 10/1995 | Nealon et al. |
| 5,758,290 A | 5/1998 | Nealon et al. |
| 5,852,630 A | 12/1998 | Langberg et al. |
| 5,927,599 A | 7/1999 | Kath |
| 6,028,885 A | 2/2000 | Minarik et al. |
| 6,195,712 B1 | 2/2001 | Pawlowski et al. |
| 6,213,404 B1 | 4/2001 | Dushane et al. |
| 6,295,541 B1 | 9/2001 | Bodnar et al. |
| 6,700,920 B1 | 3/2004 | Partyka |
| 6,778,902 B2 | 8/2004 | Hathiram et al. |
| 6,859,450 B1 | 2/2005 | Mansfield |
| 6,865,609 B1 | 3/2005 | Gubbi et al. |
| 6,870,875 B1 | 3/2005 | Partyka |
| 6,925,105 B1 | 8/2005 | Partyka |
| 7,035,310 B1 | 4/2006 | Roberts |
| 7,035,652 B1 * | 4/2006 | Kelkar ................. H04L 1/0007 455/452.1 |
| 7,050,906 B2 | 5/2006 | Hathiram et al. |
| 7,061,428 B1 | 6/2006 | Amir et al. |
| 7,224,713 B2 | 5/2007 | Partyka |
| 7,301,986 B2 | 11/2007 | Partyka |
| 7,330,736 B2 | 2/2008 | Redi |
| 7,664,553 B2 | 2/2010 | Roberts |
| 7,961,705 B2 | 6/2011 | Kennedy et al. |
| 8,255,754 B2 | 8/2012 | Tsfati et al. |
| 8,259,775 B1 | 9/2012 | Nichols |

(Continued)

*Primary Examiner* — Young T Tse

(74) *Attorney, Agent, or Firm* — Shumaker & Sieffert, P.A.

(57) ABSTRACT

A building automation system includes a host device and a plurality of client devices that can communicate with the host device via a frequency hopping protocol. The host device is configured to create and/or store a frequency hopping sequence including a plurality of ordered predetermined frequencies, and listens for communications from the plurality of client devices. Each cycle through the frequency hopping sequence is considered to be a channel. The host device may define a plurality of channels, with some of the plurality of channels reserved for routine messaging between the host device and the plurality of client devices and some of the plurality of channels reserved at times for higher bandwidth data communications.

20 Claims, 6 Drawing Sheets

(56) References Cited

U.S. PATENT DOCUMENTS

| | | |
|---|---|---|
| 8,385,384 B1 | 2/2013 | Kidder et al. |
| 8,553,743 B1 | 10/2013 | Nichols et al. |
| 8,677,342 B1 | 3/2014 | Kidder et al. |
| 8,861,566 B2 | 10/2014 | Nichols |
| 8,891,586 B1 | 11/2014 | Nichols |
| 9,210,125 B1 | 12/2015 | Nichols |
| 9,442,500 B2 | 9/2016 | Nichols et al. |
| 9,488,994 B2 | 11/2016 | Zywicki et al. |
| 9,735,831 B1 | 8/2017 | Juntunen et al. |
| 2001/0004375 A1 | 6/2001 | Partyka |
| 2002/0136335 A1 | 9/2002 | Liou et al. |
| 2003/0198245 A1 | 10/2003 | Bradford et al. |
| 2004/0202229 A1 | 10/2004 | Raphaeli et al. |
| 2004/0223515 A1 | 11/2004 | Rygielski et al. |
| 2005/0003794 A1 | 1/2005 | Liu |
| 2005/0047383 A1 | 3/2005 | Yoshida |
| 2005/0170868 A1 | 8/2005 | Fischer |
| 2006/0227852 A1 | 10/2006 | Black et al. |
| 2007/0093975 A1 | 4/2007 | Hoogenboom |
| 2007/0135179 A1 | 6/2007 | Hardman et al. |
| 2007/0139183 A1 | 6/2007 | Kates |
| 2007/0291822 A1 | 12/2007 | Staley et al. |
| 2008/0219324 A1 | 9/2008 | Park et al. |
| 2008/0267259 A1 | 10/2008 | Budampati et al. |
| 2009/0100189 A1 | 4/2009 | Bahren et al. |
| 2010/0007521 A1 | 1/2010 | Cornwall |
| 2010/0182981 A1 | 7/2010 | Thoukydides et al. |
| 2013/0211600 A1 | 8/2013 | Dean-Hendricks et al. |
| 2014/0041846 A1 | 2/2014 | Leen et al. |
| 2016/0285577 A1* | 9/2016 | Chessher .............. H04J 3/1682 |

\* cited by examiner

HIGH BANDWIDTH CHANNEL IN A FREQUENCY HOPPING SYSTEM

TECHNICAL FIELD

The present disclosure pertains to wireless communication and more particularly relates to wireless communication between devices employing frequency hopping.

BACKGROUND

Frequency hopping is used for wireless communication between devices. In frequency hopping, the devices are programmed to communicate at each of a predetermined sequence of frequencies by automatically "hopping" from one frequency to the next. What would be desirable is an improved frequency hopping communication protocol that facilitates high bandwidth communication bursts between devices.

SUMMARY

The present disclosure is directed to an improved frequency hopping communication protocol that facilitates high bandwidth communication bursts between devices within a building automation system.

In one example, a building automation system includes a host device and a plurality of client devices that can communicate with the host device via a frequency hopping protocol. The host device is configured to create and/or store a frequency hopping sequence including a plurality of ordered predetermined frequencies, and listens for communications from the plurality of client devices. Each cycle through the frequency hopping sequence is considered to be a channel. The host device may define a plurality of channels, with some of the plurality of channels reserved for routine messaging between the host device and the plurality of client devices and some of the plurality of channels reserved at times for more substantial data communications such as higher bandwidth communication bursts.

In a particular example, a host device has a memory for storing a frequency hopping sequence that includes a plurality of predetermined frequencies arranged in a predetermined order from a first predetermined frequency to a last predetermined frequency. A controller is operatively coupled to the memory and a receiver is operatively coupled to the controller. The receiver is configured to accept from the controller a frequency selection input that selects one of the predetermined frequencies of the frequency hopping sequence and the receiver listens for a message from the plurality of client devices on the selected one of the predetermined frequencies. The controller is configured to provide a sequence of frequency selection inputs to the receiver that repeatedly cycles through the frequency hopping sequence stored in the memory, wherein each cycle through the frequency hopping sequence is defined as a channel, and wherein the controller repeatedly cycles through two or more channels from a first channel to a last channel.

In some cases, when a reserving client device of the plurality of client devices reserves one or more channels, resulting in one or more reserved channels, and the remaining client devices are informed of the reservation and in response do not transmit messages during the one or more reserved channels, the controller of the host device receives via the receiver one or more messages from only the reserving client during the one or more reserved channels. The controller of the host device may be further configured to receive via the receiver a message from one or more of the plurality of client devices during one or more of the channels that are not part of the one or more reserved channels.

In another example, a building automation system may include a host device and a plurality of client devices. The host device has a memory for storing a frequency hopping sequence that includes a plurality of predetermined frequencies arranged in a predetermined order from a first predetermined frequency to a last predetermined frequency. A controller is operatively coupled to the memory and a receiver is operably coupled to the controller. The receiver is configured to accept from the controller a frequency selection input that selects one of the predetermined frequencies of the frequency hopping sequence, and the receiver listens for a message on the selected one of the predetermined frequencies. The controller is configured to provide a sequence of frequency selection inputs to the receiver that repeatedly cycles through the frequency hopping sequence stored in the memory, wherein each cycle through the frequency hopping sequence is defined as a channel, and wherein the controller repeatedly cycles through two or more channels from a first channel to a last channel.

In some cases, any of the plurality of client devices may become a reserving client device and reserve one or more of the channels, resulting in one or more reserved channels, the remaining client devices are informed of the reservation and in response the remaining client devices do not transmit during the one or more reserved channels, such that the controller of the host device receives via the receiver a communication from only the reserving client device during the one or more reserved channels. The controller may be further configured to receive via the receiver a communication from one or more of the plurality of client devices during one or more of the channels that are not part of the one or more reserved channels.

In yet another example of the disclosure, a method for wirelessly communicating between a host device and a plurality of client devices includes the host device and the plurality of client devices repeatedly cycling through a frequency hopping sequence that has a plurality of frequencies, wherein each cycle through the frequency hopping sequence is defined as a channel, and repeatedly cycling through two or more channels from a first channel to a last channel. A reserving client device of the plurality of client devices is allowed to reserve one or more of the two or more channels, resulting in one or more reserved channels. The remaining client devices are informed of the reservation and in response, the remaining client devices do not transmit during the one or more reserved channels. Only the reserving client device communicates with the host device during the one or more reserved channels. The method further includes receiving a communication from one or more of the plurality of client devices during one or more of the channels that are not part of the one or more reserved channels.

In another example of the disclosure, a method for wirelessly communicating between a host device and a plurality of client devices includes accepting at the host device a high bandwidth request from one of the plurality of client devices and dedicating a plurality of sequential frequencies of a repeating frequency hopping sequence to service the high bandwidth request. The method includes interrupting the high bandwidth request, and servicing one or more lower bandwidth requests from other client devices using the frequency hopping sequence, and then returning to servicing the high bandwidth request by dedicating a plurality of sequential frequencies of the repeating frequency hopping sequence to service the high bandwidth request.

The above summary of some illustrative embodiments is not intended to describe each disclosed embodiment or every implementation of the present disclosure. The Figures, and Description, which follow, more particularly exemplify some of these embodiments.

BRIEF DESCRIPTION OF THE FIGURES

The disclosure may be more completely understood in consideration of the following description in connection with the accompanying drawings, in which.

Figure 1:
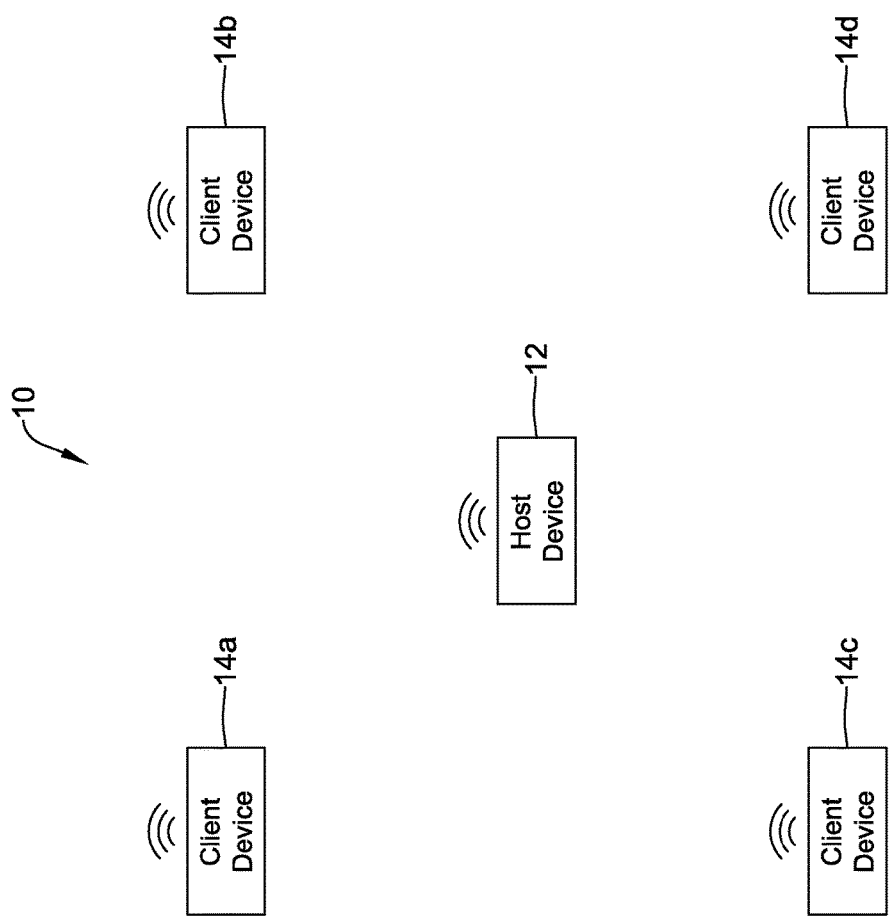
FIG. 1 is a schematic block diagram of an illustrative building automation system in accordance with the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used connection with other embodiments whether or not explicitly described unless clearly stated to the contrary.

The following description should be read with reference to the drawings in which similar structures in different drawings are numbered the same. The drawings, which are not necessarily to scale, depict illustrative embodiments and are not intended to limit the scope of the disclosure.

FIG. 1 is a schematic block diagram of an illustrative building automation system 10. The building automation system 10 includes a host device 12 and a plurality of client devices 14a, 14b, 14c, 14d. While a total of four client devices 14a, 14b, 14c, 14d are illustrated, it will be appreciated that this is merely illustrative, as the building automation system 10 may include any number of client devices, such as one client device, two client devices, three client devices, five client devices, six client devices or more. In some cases, for example, the building automation system 10 may be a security system in which the host device 12 is a security system controller, and the plurality of client devices 14a, 14b, 14c, 14d may represent individual security sensors, security cameras and the like. As another example, the building automation system 10 may be an HVAC system in which the host device 12 is an HVAC controller and the plurality of client devices 14a, 14b, 14c, 14d may represent individual HVAC components such as temperature sensors, motion (occupancy) sensors, wireless thermostats such as in a zoning system, and the like. In another example, the building automation system 10 may include a security system, an HVAC system, an access control system and a lighting control system, in which the host device 12 is a building automation controller, and the plurality of client devices 14a, 14b, 14c, 14d may represent individual building automation devices. These are just examples.

The host device 12 may communicate with the plurality of devices 14a, 14b, 14c, 14d using any of a variety of different wireless communication protocols, including but not limited to WiFi, Bluetooth, Zigbee, REDLINK®, or any other suitable wireless communication protocol. REDLINK® is a wireless communication protocol that is available from Honeywell International Inc. In some cases, REDLINK® includes a frequency hopping protocol in which a host device cycles through a series of predetermined frequencies, listening for communications from client devices. Each client device may communicates with the host device at one or more unique frequencies, thereby reducing or eliminating issues with two or more client devices trying to transmit at the same time and on the same frequency. In some cases, communicating over a series of frequencies enables communications to occur at higher power levels without running afoul of FCC wireless communication standards.

In some cases, the host device 12 will utilize a transmitter to transmit receipt acknowledgements to client devices 14a, 14b, 14c, 14d that successfully transmit data to a receiver of the host device 12. In some instances, the host device 12 will periodically transmit a synchronization message to all of the client devices 14a, 14b, 14c, 14d that may be in communication with the host device 12. In some cases, a synchronization message may include a revised frequency hopping sequence, or may just include a timing signal so that the client devices 14a, 14b, 14c, 14d may be temporally re-aligned with a clock in the host device 12.

Figure 2:
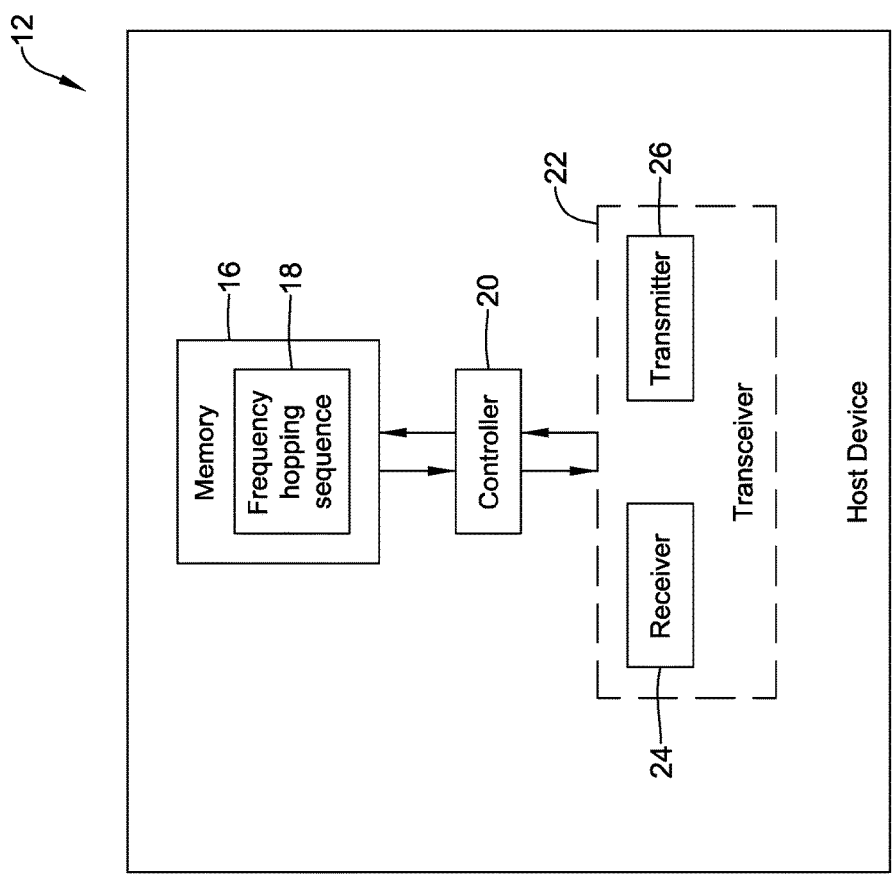
FIG. 2 is a schematic block diagram of an illustrative host device useable in the building automation system of FIG. 1.

FIG. 2 is a schematic block diagram of an illustrative host device 12. In some cases, as illustrated, the host device 12 may include a memory 16 for storing a frequency hopping sequence 18. In some instances, the frequency hopping sequence 18 may include a plurality of predetermined frequencies arranged in a predetermined order from a first predetermined frequency to a last predetermined frequency. The host device 12 may include a controller 20 that is operably coupled to the memory 16 such that the controller 20 has access to the frequency hopping sequence 18. A transceiver 22, which may in some cases include a receiver 24 and a transmitter 26, may be operably coupled to the controller 20.

In some cases, the transceiver 22, including the receiver 24, is configured to accept from the controller 20 a frequency selection input that selects one of the predetermined frequencies of the frequency hopping sequence 18, and the receiver 24 listens for a message on the selected one of the predetermined frequencies of the frequency hopping sequence 18. In some instances, the controller 20 may be configured to provide a sequence of frequency selection inputs to the receiver 24 that repeatedly cycles through the frequency hopping sequence 18 stored in the memory 16. In some cases, each cycle through the frequency hopping sequence 18 may be defined by the controller 20 as being a channel, and the controller 20 may repeatedly cycle through two or more channels, such as from a first channel to a last channel.

The controller 20 may define any number of distinct channels. In some cases, the frequency hopping sequence 18 is a fixed set of frequencies, and may be the same sequence in each of the channels defined by the controller 20. In some cases, the frequency hopping sequence 18 may be an adapted set of frequencies, and may vary from channel to channel, for example. In some cases, the total number of defined channels may be less than the number of frequencies within the frequency hopping sequence 18, but this is not required in all cases.

In some cases, the controller 20 may be configured to allow any client device of the plurality of client devices (such as but not limited to one of the client devices 14a, 14b, 14c, 14d shown in FIG. 1) to reserve one or more of the defined channels, resulting in one or more reserved channels in which only the reserving client device 14a, 14b, 14c, 14d transmits to the host device 12. In some cases, after a reserving client device 14a, 14b, 14c, 14d reserves one or more of the defined channels, the other client devices 14a, 14b, 14c, 14d are informed of the reservation, and in response the other client devices 14a, 14b, 14c, 14d do not transmit messages during the one or more reserved channels. In some instances, additionally or alternatively, the controller 20 may be configured to receive a communication from only the reserving client device during the one or more reserved channels. In some cases, the controller 20 may be configured such that at least one of the two or more channels cannot be reserved by any of the plurality of client devices (e.g. client devices 14a, 14b, 14c, 14d of FIG. 1). In some cases, any of the two or more channels can be reserved by a reserving client device except one of the two or more channels. In some instances, the controller 20 may be configured to determine which channel or channels may be reserved and which channel or channels cannot be reserved, and may also determine at what times particular channels can or cannot be reserved.

In some cases, a first communication from a client device 14a, 14b, 14c, 14d during one of the channels that is not part of the one or more reserved channels may include a first number of data bits. A second communication from only the reserving client device 14a, 14b, 14c, 14d during one of the reserved channels may include a second number of data bits, where the second number of data bits is greater than the first number of data bits. Accordingly, in some cases, a client device may reserve one or more channels for transmitting relatively larger messages. In some instances, the first communication may have a first time sensitivity while the second communication may have a second time sensitivity that is greater than the first time sensitivity. For example, the first communication may include an HVAC parameter while the second communication may include a digital photograph and/or a digital video. In some cases, a reserved channel (or channels) may be used to, for example, download software and/or firmware updates from the host device 12. In some cases, a reserved channel (or channels) may be used for uploading data logs, video, photographic images, and/or other larger data items to the host device 12.

It will be appreciated that depending on exactly what is being uploaded or downloaded may influence the time sensitivity of the data being transmitted. For example, if the data is a security photo or video, time may be of the essence, and the data may be considered as having a high time sensitivity. On the other hand, if the data is a software update being downloaded to the client device, or perhaps a data log being uploaded from the client device, the data may be considered as having a lower time sensitivity. In other words, the communication from the client device during one or more of the predetermined frequencies of the frequency hopping sequence that are not part of the one or more reserved channels may have a first time sensitivity, while the communication from only the reserving client device during the one or more reserved channels may have a second time sensitivity that is greater than the first time sensitivity. Said another way, if a larger data package needs to be communicated in a short order, the larger data package may require a higher bandwidth communication channel and thus may be communicated via one or more reserved channels.

In some cases, particularly if a client device has a larger amount of time-sensitive data to upload, the controller 20 (of the host device 12) may allocate a relatively greater number of channels as reserved channels for uploading the data, with a relatively lower number of un-reserved channels used for routine communications between the host and client devices. Conversely, if the data is not particularly time-sensitive, and/or if there are a large number of client devices desiring routine communication, the controller 20 may allocate a relatively lower number of channels as reserved channels, while maintaining a relatively higher number of un-reserved channels for routine communications.

In some cases, the controller 20 may be considered as including, or providing the functionality of, a frequency hopping module that is configured to generate or edit the frequency hopping sequence 18, as well as a channel timing module that is configured to group successive passes through the frequency hopping sequence 18 as being distinct channels. In the absence of a request for high bandwidth communication, the receiver 24 may listen for a unique device at each frequency. In some cases, and in the absence of a request for high bandwidth communication, the receiver 24 may sequentially listen for a low bandwidth message at each of the frequencies in a particular channel, then sequentially listen for a low bandwidth message at each of the frequencies in a subsequent channel, and so on.

If a client device had transmitted a request for high bandwidth communication, the receiver 24 may sequentially listen for a single device at each frequency within a reserved channel. In some cases, and in the presence of a request for high bandwidth communication, the receiver 24 may sequentially listen for part of a high bandwidth message from the requesting client device at each of the frequencies within a particular reserved channel, and then sequentially listens for a low bandwidth message at each of the frequencies in a subsequent un-reserved channel.

In some cases, and in the absence of a request for high bandwidth communication, the host device 12 may sequentially listen to each of the frequencies in the first channel for any client devices including the first client device and the second client device and then sequentially listen to each of the frequencies in the second channel for any client devices including the first client device and the second client device before returning to the first channel. In some cases, for example, when sequentially listening to each of the frequencies in the first channel and/or the second channel, the host device 12 may be configured to stay at a particular frequency at which a client device is transmitting until that client device completes its message, and then move on to the next frequency.

Figure 3:
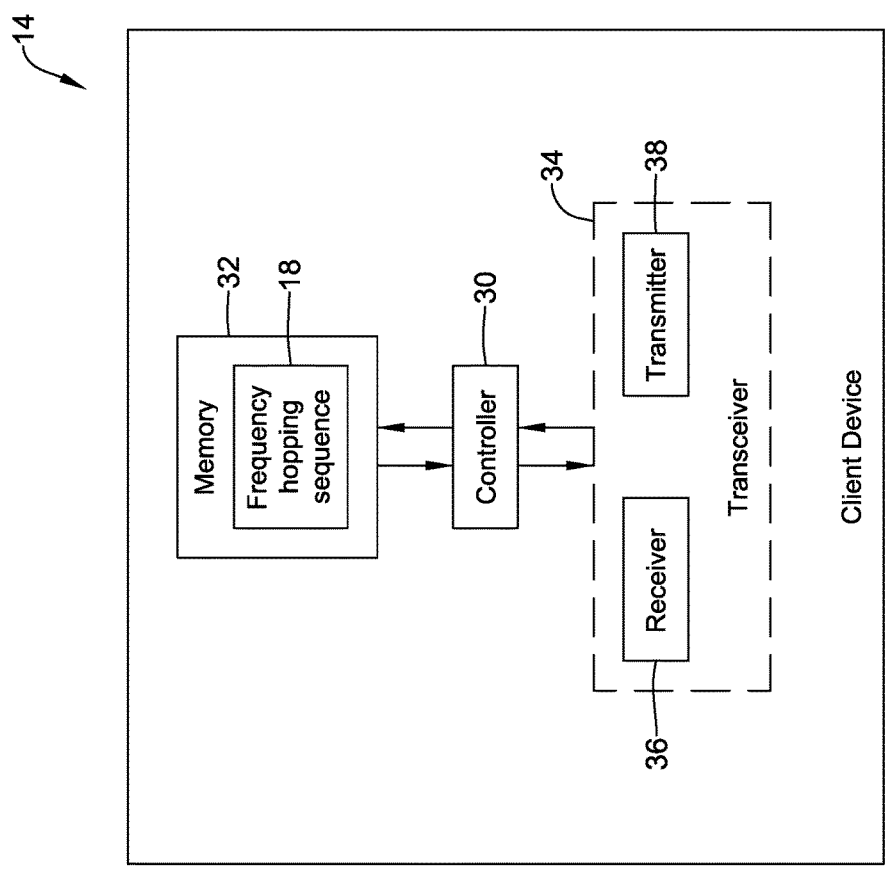
FIG. 3 is a schematic block diagram of an illustrative client device useable in the building automation system of FIG. 1.

FIG. 3 is a schematic block diagram of an illustrative client device 14, which may be considered as being an example of any of the client devices 14a, 14b, 14c, 14d shown in FIG. 1. In some cases, the client device 14 includes a controller 30 that is operably coupled to a memory 32 and a transceiver 34. The memory 32 includes the frequency hopping sequence 18. The transceiver 34 may include a receiver 36 and/or a transmitter 38. The client device 14 may include additional features (not illustrated), such as for example, a thermocouple if the client device 14 is a wireless thermostat, or a wireless temperature sensor. The client device 14 may include a still camera and/or a video camera, or other security sensors such as a noise sensor, a glass break sensor, a motion sensor, and the like if the client device 14 is a security device. These are just examples.

In some cases, the controller 30 may regulate operation of the transceiver 34 to communicate with the host device 12 (FIG. 1). In some instances, particularly if the host device 12 has informed the client device 14 that another client device has reserved one or more channels, the controller 30 will keep track of when the reserving client device is transmitting, and will not transmit during those times and/or on those frequencies. In some cases, the controller 30 is also configured to provide whatever functionality the client device 14 is otherwise expected to provide. In some cases, the controller 30 receives, via the receiver 36, a copy of a synchronization message broadcast by the host device 12. If the host device 12 broadcasts receipt acknowledgements of routine transmissions, these are also received by the controller 30 via the receiver 36. Communications to the host device 12 are transmitted by the transmitter 38 under the instructions of the controller 30.

In some cases, the controller 30 of the client device 14 may be configured to include or otherwise provide the functionality of a frequency determination module that is configured to identify a transmission frequency for the client device 14 to use within the frequency hopping sequence 18 and a transmission timing module that is configured to determine when the identified transmission frequency occurs during successive intervals of the frequency hopping sequence 18 such that the transmitter 38 can transmit (or the receiver 36 can listen) at the appropriate time and on the appropriate frequency.

Figure 4:
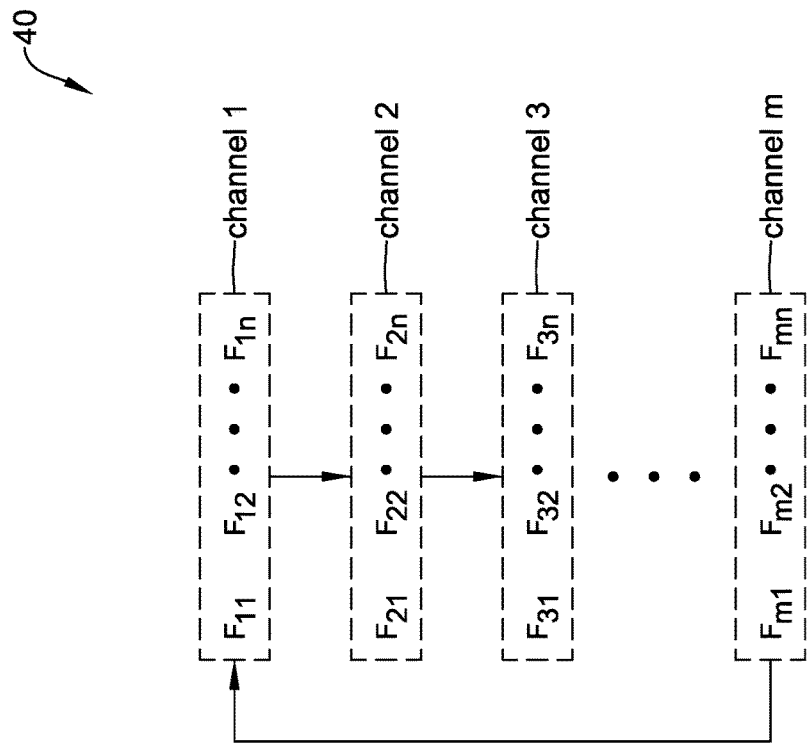
FIG. 4 is a schematic illustration of an illustrative frequency hopping sequence arranged into channels in accordance with the present disclosure.

FIG. 4 is a schematic illustration 40 showing how multiple cycles through the frequency hopping sequence 18 (FIG. 1) may be divided into channels. As illustrated, a CHANNEL 1 may include a first frequency $F_{11}$, a second frequency $F_{12}$ through an nth frequency $F_{1N}$. A CHANNEL 2 may include first frequency $F_{21}$, a second frequency $F_{22}$ through an nth frequency $F_{2N}$. A CHANNEL 3 may include a first frequency $F_{31}$, a second frequency $F_{32}$ through an $N^{th}$ frequency $F_{3N}$. There may be additional channels, extending through a CHANNEL M that may include a first frequency $F_{M1}$, a second frequency $F_{M2}$ through an $N^{th}$ frequency $F_{MN}$. After moving through CHANNEL 1, CHANNEL 2, CHANNEL 3 through CHANNEL M, the system may revert back to CHANNEL 1 and the process repeats.

In some cases, the frequencies in each channel are the same as the corresponding frequency, relative to the frequency sequence, in another channel. For example, frequency $F_{11}$ may be the same frequency as frequency $F_{21}$, or frequency $F_{31}$, or even frequency $F_{M1}$. The frequency $F_{12}$ may be the same frequency as frequency $F_{22}$, or frequency $F_{32}$, or even frequency $F_{M2}$, and so on. In some cases, however, at least some of the channels may include frequencies that are unique to that particular channel. In some instances, each channel may include at least some of the same frequencies, but in a different order and/or with a different temporal spacing between adjacent frequencies in the sequence. These are just examples.

In some cases, the frequency hopping sequence 18 includes 10 to 100 distinct frequencies, or 25 to 75 distinct frequencies, or about 50 distinct frequencies. In some cases, the host device 12 is configured to group successive passes through the frequency hopping sequence into at least a first channel, a second channel, a third channel and a fourth channel. In some instances, a number of channels, out of four channels, assigned for high bandwidth communication upon receipt of a request for high bandwidth communication may be one channel, two channels or three channels out of the four channels. In some cases, the number of channels assigned for high bandwidth communication may vary among successive requests for high bandwidth communication.

Figure 5:
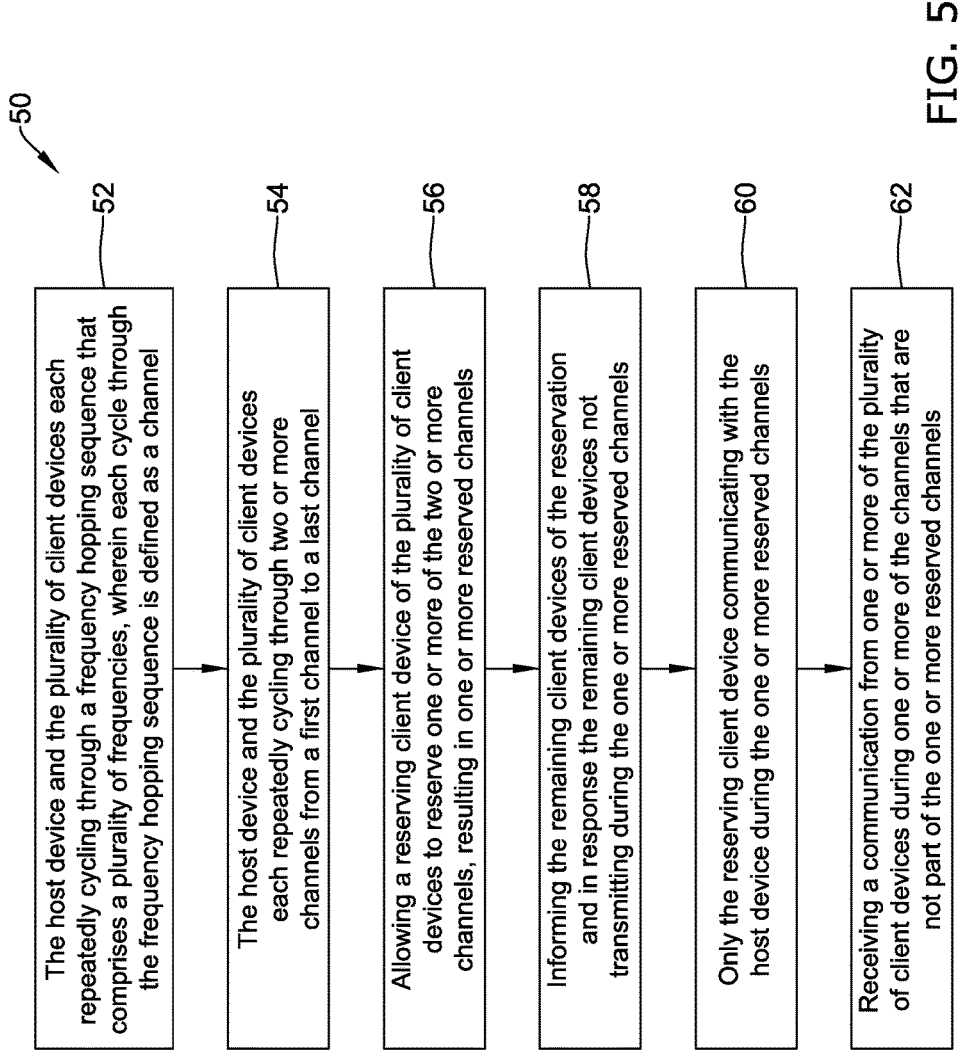
FIG. 5 is a flow diagram showing an illustrative method of communication within the building automation system of FIG. 1.

FIG. 5 is a flow diagram showing an illustrative method 50 of communicating between a host device (such as the host device 12) and a plurality of client devices (such as the client devices 14a, 14b, 14c, 14d). As shown for example at block 52, the method includes the host device and the plurality of client devices repeatedly cycling through a frequency hopping sequence that includes a plurality of frequencies, wherein each cycle through the frequency hopping sequence is defined as a channel. The host device and the plurality of client devices may repeatedly cycle through two or more channels from a first channel to a last channel, as indicated at block 54. In some cases, at least one of the two or more channels cannot be reserved by any of the plurality of client devices. In some instances, any of the two or more channels can be reserved by a reserving client device except one of the two or more channels.

A client device of the plurality of client devices may be allowed to reserve one or more of the two or more channels, resulting in one or more reserved channels as seen at block 56. In some cases, once a client device has reserved one or more of the two or more channels, the other client devices may be informed of the reservation and in response, the other client devices do not transmit during the one or more reserved channels, as indicated at block 58. As shown at block 60, only the reserving client device communicates with the host device during the one or more reserved channels. In some cases, this communication may include a firmware update communication, a video, a photographic image, a data log, and/or any other suitable communication. Because there is at least one un-reserved channel, a communication may be received from one or more of the plurality of client devices during one or more of the channels that are not part of the one or more reserved channels, as indicated at block 62.

Figure 6:
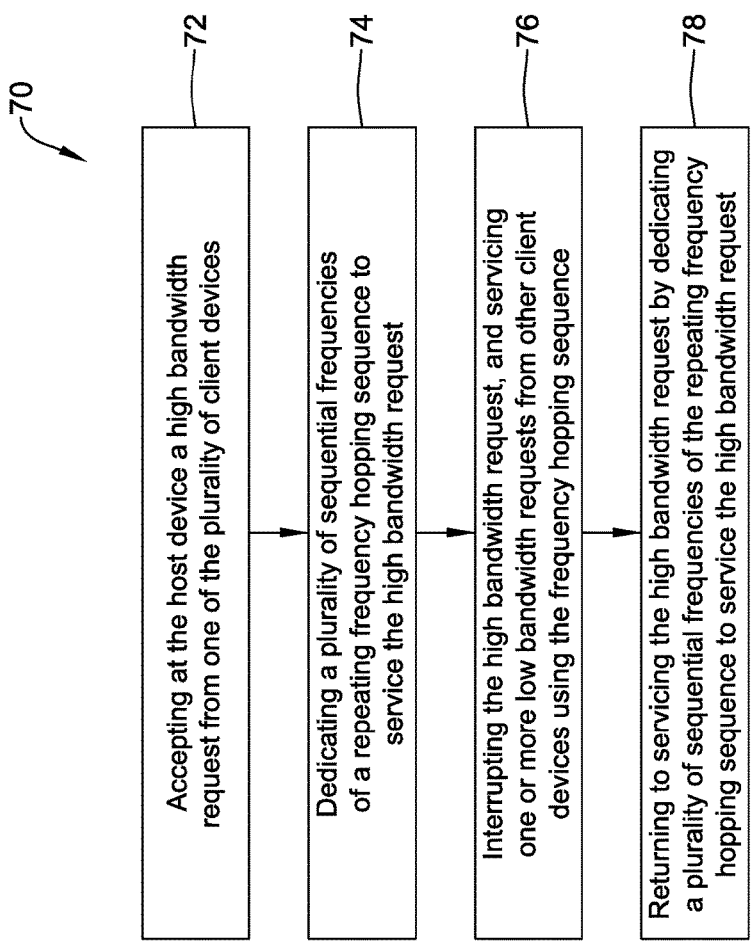
FIG. 6 is a flow diagram showing an illustrative method of communication within the building automation system of FIG. 1.

FIG. 6 is a flow diagram showing an illustrative method 70 of communicating between a host device (such as the host device 12) and a plurality of client devices (such as the client devices 14*a*, 14*b*, 14*c*, 14*d*). As seen at block 72, a high bandwidth request from one of the plurality of client devices may be accepted. In response, and as illustrated at block 74, a plurality of sequential frequencies of a repeating frequency hopping sequence may be dedicated to service the high bandwidth request. In some cases, and as noted at block 76, the high bandwidth request may be interrupted in order to service one or more lower bandwidth requests from other client devices using the frequency hopping sequence. As seen at block 78, the illustrative method 70 may include returning to servicing the high bandwidth request by dedicating a plurality of sequential frequencies of the repeating frequency hopping sequence to service the high bandwidth request.

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment being used in other embodiments.

What is claimed is:

1. A host device for wirelessly receiving messages from a plurality of client devices, the host device comprising:
   a memory configured to store a frequency hopping sequence, the frequency hopping sequence including a plurality of predetermined frequencies arranged in a predetermined order from a first predetermined frequency to a last predetermined frequency;
   a controller operatively coupled to the memory; and
   a receiver operatively coupled to the controller and configured to accept from the controller a frequency selection input that selects one of the predetermined frequencies of the frequency hopping sequence and the receiver listens for a message from the plurality of client devices on the selected one of the predetermined frequencies;
   the controller is configured to provide a sequence of frequency selection inputs to the receiver that repeatedly cycles through the frequency hopping sequence stored in the memory, wherein each cycle through the frequency hopping sequence is defined as a channel, and wherein the controller repeatedly cycles through two or more channels from a first channel to a last channel;
   wherein when a reserving client device of the plurality of client devices reserves one or more channels, resulting in one or more reserved channels, and the remaining client devices are informed of the reservation and in response do not transmit messages during the one or more reserved channels, the controller of the host device receives via the receiver one or more messages from only the reserving client device during the one or more reserved channels; and
   the controller of the host device is configured to receive via the receiver a message from one or more of the plurality of client devices during one or more of the channels that are not part of the one or more reserved channels.

2. The host device of claim 1, wherein the controller is configured such that at least one of the two or more channels cannot be reserved by any of the plurality of client devices.

3. The host device of claim 2, wherein a number of the two or more channels that cannot be reserved is programmable.

4. The host device of claim 1, wherein any of the two or more channels can be reserved by the reserving client device except one of the two or more channels.

5. The host device of claim 1, wherein a number of channels through which the controller repeatedly cycles is less than a number of the plurality of predetermined frequencies of the frequency hopping sequence.

6. The host device of claim 1, wherein the frequency hopping sequence includes a fixed set of frequencies.

7. The host device of claim 1, wherein the frequency hopping sequence includes an adaptive set of frequencies.

8. The host device of claim 1, wherein the frequency hopping sequence is programmable.

9. The host device of claim 1, wherein:
   the controller is further configured to receive a first communication from a client device during one channel that is not part of the one or more reserved channels, wherein the first communication comprises a first number of data bits; and
   the controller is further configured to receive a second communication from only the reserving client device during one of the reserved channels, wherein the second communication comprises a second number of data bits, wherein the second number of data bits is greater than the first number of data bits.

10. The host device of claim 9, wherein:
    the first communication has a first time sensitivity; and
    the second communication has a second time sensitivity, wherein the second time sensitivity is greater than the first time sensitivity.

11. The host device of claim 9, wherein:
    the first communication comprises a heating, ventilation, and air conditioning (HVAC) parameter; and
    the second communication comprises a digital photograph and/or a digital video.

12. A building automation system comprising:
    a plurality of client devices;
    a host device, the host device including;
       a memory configured to store a frequency hopping sequence, the frequency hopping sequence including a plurality of predetermined frequencies arranged in a predetermined order from a first predetermined frequency to a last predetermined frequency;
       a controller operatively coupled to the memory; and
       a receiver operatively coupled to the controller and configured to accept from the controller a frequency selection input that selects one of the predetermined frequencies of the frequency hopping sequence and the receiver listens for a message on the selected one of the predetermined frequencies;
    the controller is configured to provide a sequence of frequency selection inputs to the receiver that repeatedly cycles through the frequency hopping sequence stored in the memory, wherein each cycle through the frequency hopping sequence is defined as a channel, and wherein the controller repeatedly cycles through two or more channels from a first channel to a last channel;
    any of the plurality of client devices may become a reserving client device and reserve one or more of the channels, resulting in one or more reserved channels, the remaining client devices are informed of the reservation and in response the remaining client devices do not transmit during the one or more reserved channels, such that the controller of the host device receives via the receiver a communication from only the reserving client device during the one or more reserved channels; and the controller is configured to receive via the receiver a communication from one or more of the plurality of client devices during one or more of the channels that are not part of the one or more reserved channels.

13. The building automation system claim 12, wherein the building automation system is configured such that at least one of the two or more channels cannot be reserved by any of the plurality of client devices.

14. The building automation system claim 12, wherein any of the two or more channels can be reserved by the reserving client device except one of the two or more channels.

15. The building automation system of claim 12, wherein the frequency hopping sequence includes a fixed set of frequencies.

16. The building automation system of claim 12, wherein the frequency hopping sequence includes an adaptive set of frequencies.

17. A method for wirelessly communicating between a host device and a plurality of client devices, the method comprising:

the host device and the plurality of client devices each repeatedly cycling through a frequency hopping sequence that comprises a plurality of frequencies, wherein each cycle through the frequency hopping sequence is defined as a channel;

the host device and the plurality of client devices each repeatedly cycling through two or more channels from a first channel to a last channel;

allowing a reserving client device of the plurality of client devices to reserve one or more of the two or more channels, resulting in one or more reserved channels;

informing the remaining client devices of the reservation and in response the remaining client devices not transmitting during the one or more reserved channels;

only the reserving client device communicating with the host device during the one or more reserved channels; and receiving a communication from one or more of the plurality of client devices during one or more of the channels that are not part of the one or more reserved channels.

18. The method of claim 17, wherein at least one of the two or more channels cannot be reserved by any of the plurality of client devices.

19. The method of claim 17, wherein any of the two or more channels can be reserved by the reserving client device except one of the two or more channels.

20. The method of claim 17, wherein the communication from only the reserving client device during the one or more reserved channels comprises a firmware update communication.

\* \* \* \* \*